United States Patent
Oyman

(10) Patent No.: US 11,026,147 B2
(45) Date of Patent: Jun. 1, 2021

(54) DYNAMIC ADAPTATION OF MAXIMUM PACKET LOSS RATE (PLR) FOR SINGLE RADIO VOICE CALL CONTINUITY (SRVCC) HANDOVER OPTIMIZATION USING SESSION DESCRIPTION PROTOCOL (SDP)

(71) Applicant: Apple Inc., Cupertino, CA (US)

(72) Inventor: Ozgur Oyman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/274,901

(22) Filed: Feb. 13, 2019

(65) Prior Publication Data

US 2019/0182741 A1  Jun. 13, 2019

Related U.S. Application Data

(60) Provisional application No. 62/630,104, filed on Feb. 13, 2018.

(51) Int. Cl.
*H04W 36/30* (2009.01)
*H04W 88/06* (2009.01)
(Continued)

(52) U.S. Cl.
CPC ......... *H04W 36/30* (2013.01); *H04L 12/1407* (2013.01); *H04L 43/0829* (2013.01); *H04L 43/16* (2013.01); *H04M 15/66* (2013.01); *H04M 15/8038* (2013.01); *H04M 15/8228* (2013.01); *H04M 15/851* (2013.01); *H04M 15/852* (2013.01); *H04M 15/853* (2013.01); *H04M 15/88* (2013.01); *H04M 15/882* (2013.01);
(Continued)

(58) Field of Classification Search
CPC ... H04W 36/30; H04W 36/0022; H04W 4/24; H04W 88/06; H04W 36/0027; H04W 28/0242; H04W 36/08; H04W 28/0236; H04W 28/12; H04M 15/851; H04M 15/8038; H04M 15/852; H04M 15/853; H04M 15/882; H04M 15/8228; H04M 15/88; H04M 15/66; H04L 12/1407; H04L 43/0829; H04L 43/16
See application file for complete search history.

(56) References Cited

U.S. PATENT DOCUMENTS

2016/0044552 A1* 2/2016 Heo ...................... H04L 5/0069 370/331
2018/0352092 A1* 12/2018 Rajendran ............... H04L 65/80

* cited by examiner

*Primary Examiner* — Kiet Tang
(74) *Attorney, Agent, or Firm* — Kowert, Hood, Munyon, Rankin & Goetzel, P.C.

(57) ABSTRACT

User equipment (UE) includes processing circuitry, where to configure the UE for Single Radio Voice Call Continuity (SRVCC) handover from an LTE network to a legacy network with circuit switched (CS) communications, the processing circuitry is to encode a Session Description Protocol (SDP) message for transmission to a second UE within the LTE network. The SDP message includes a voice codec selection for voice over LTE communication with the second UE and a maximum end-to-end packet loss rate (E2E_MAX_PLR) that can be tolerated by the UE when using the voice codec. The UE decodes an SRVCC handover command from an eNB within the LTE network, the handover command based on at least one packet loss rate (PLR) associated with a packet switched voice communication link between the UE and the second UE exceeding a PLR threshold that is determined based on the E2E_MAX_PLR that can be tolerated by the UE.

19 Claims, 9 Drawing Sheets

(51) Int. Cl.
*H04W 36/00* (2009.01)
*H04M 15/00* (2006.01)
*H04L 12/26* (2006.01)
*H04W 28/02* (2009.01)
*H04L 12/14* (2006.01)
*H04W 4/24* (2018.01)
*H04W 36/08* (2009.01)

(52) U.S. Cl.
CPC ......... *H04W 4/24* (2013.01); *H04W 28/0242* (2013.01); *H04W 36/0022* (2013.01); *H04W 36/0027* (2013.01); *H04W 88/06* (2013.01); *H04W 36/08* (2013.01)

DYNAMIC ADAPTATION OF MAXIMUM PACKET LOSS RATE (PLR) FOR SINGLE RADIO VOICE CALL CONTINUITY (SRVCC) HANDOVER OPTIMIZATION USING SESSION DESCRIPTION PROTOCOL (SDP)

PRIORITY CLAIM

This application claims the benefit of priority to the U.S. Provisional Patent Application Ser. No. 62/630,104, filed Feb. 13, 2018, and entitled "DYNAMIC ADAPTATION OF MAXIMUM PACKET LOSS RATIO FOR SINGLE RADIO VOICE CALL CONTINUITY (SRVCC) HANDOVER OPTIMIZATION USING SESSION DESCRIPTION PROTOCOL (SDP)," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for dynamic adaptation of packet loss rate (PLR) for single radio voice call continuity (SRVCC) handover optimization using session description protocol (SDP).

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address dynamic adaptation of PLR for SRVCC handover optimization using SDP.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
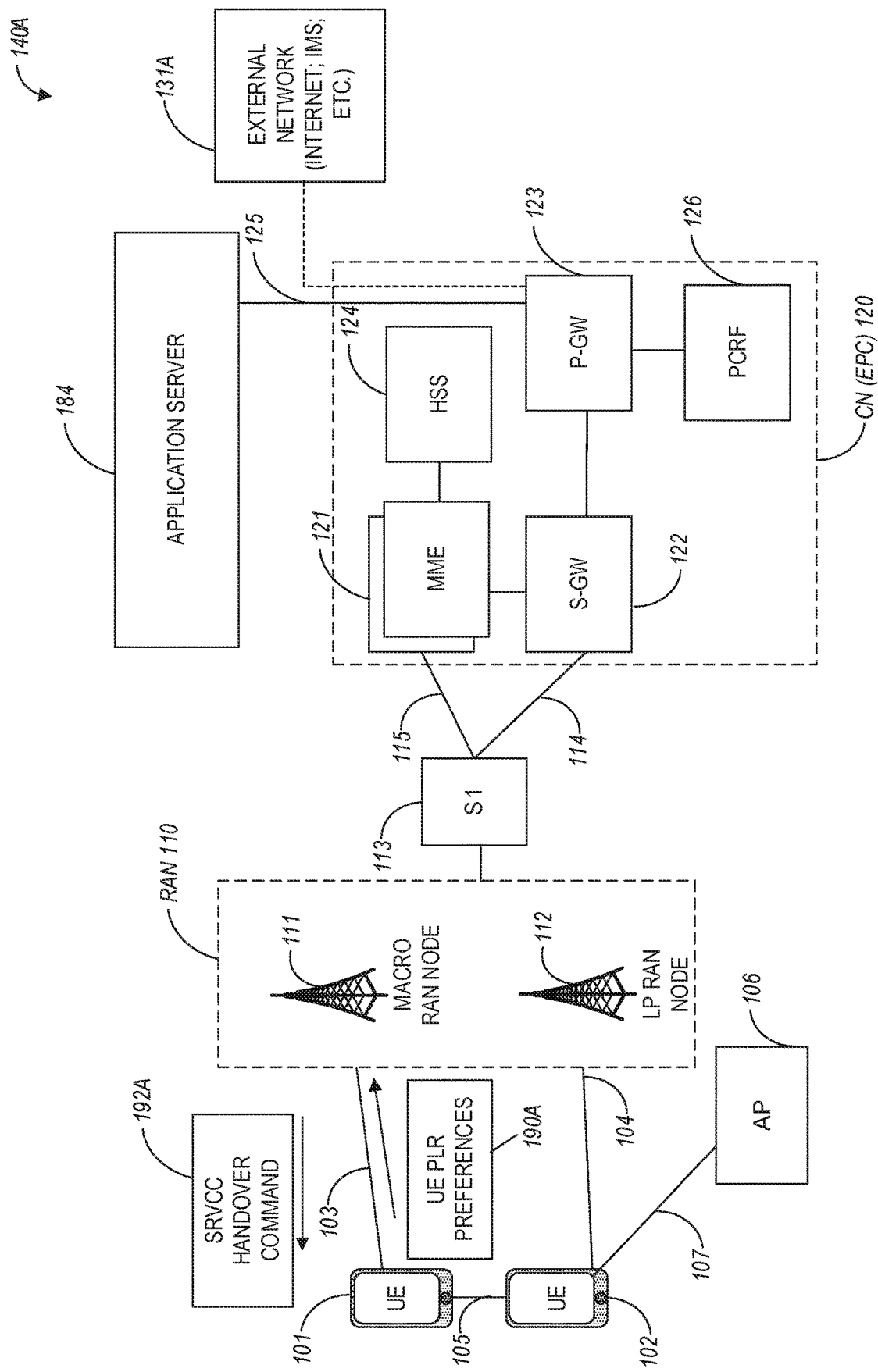
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (5GCN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Random Access procedure" or "RA procedure".

In some aspects and as described hereinbelow, UE 101 can be configured for dynamic adaptation of maximum packet loss rate (PLR) for SRVCC handover using session description protocol (SDP). More specifically, UE 101 can include PLR preferences 190A and one or more SDP messages exchanged with another UE during an SDP negotiation. The PLR preferences 190A can be detected by a core network function such as PCRF 126, and PCRF can provide one or more PLR thresholds to the corresponding eNB (e.g., 111) for use in determining whether to send an SRVCC handover command 192A two UE 101. Further description of techniques for dynamic adaptation of maximum PLR for SRVCC handover optimization using SDP is disclosed hereinbelow.

Figure 1B:
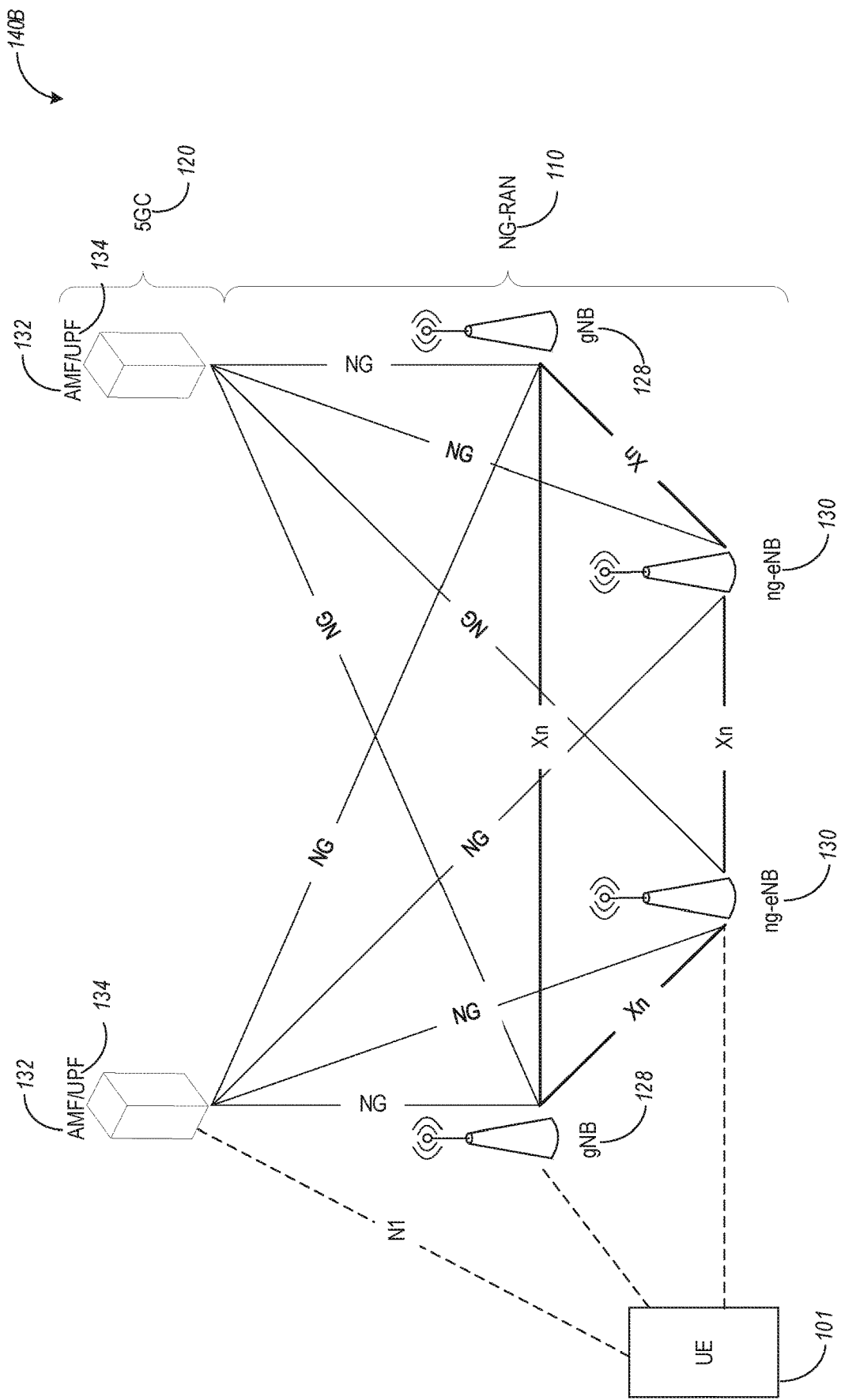
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
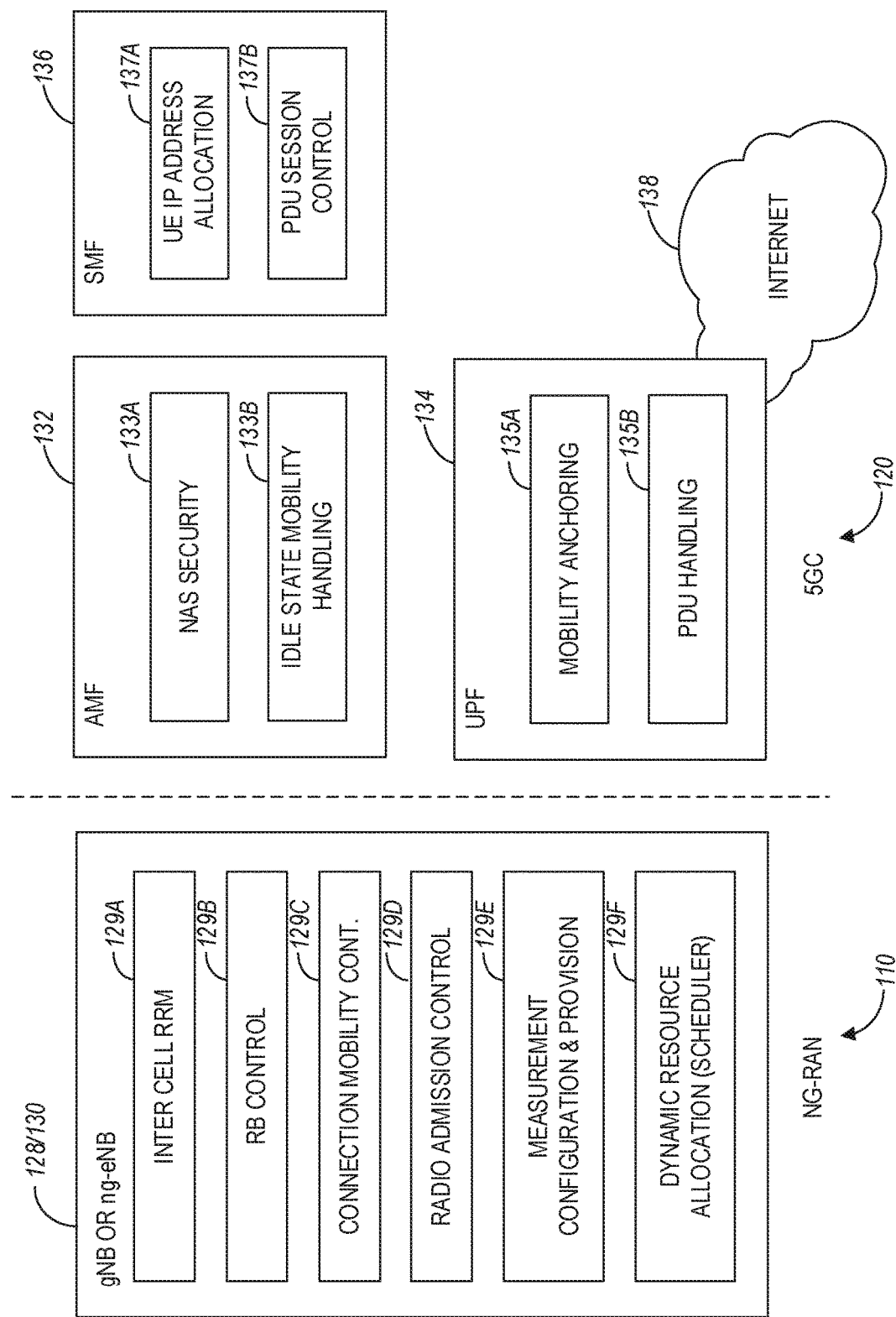
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
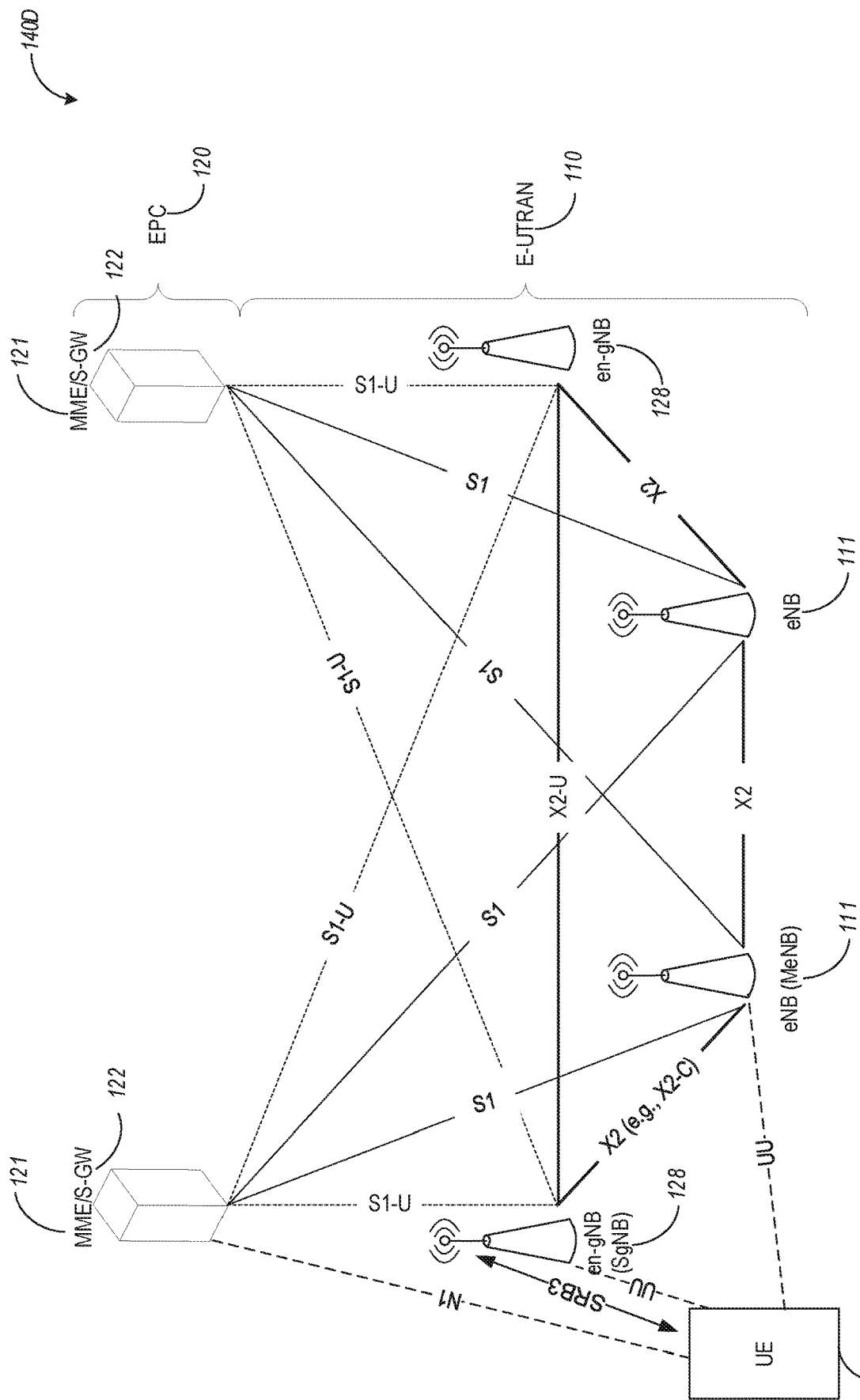
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 1E:
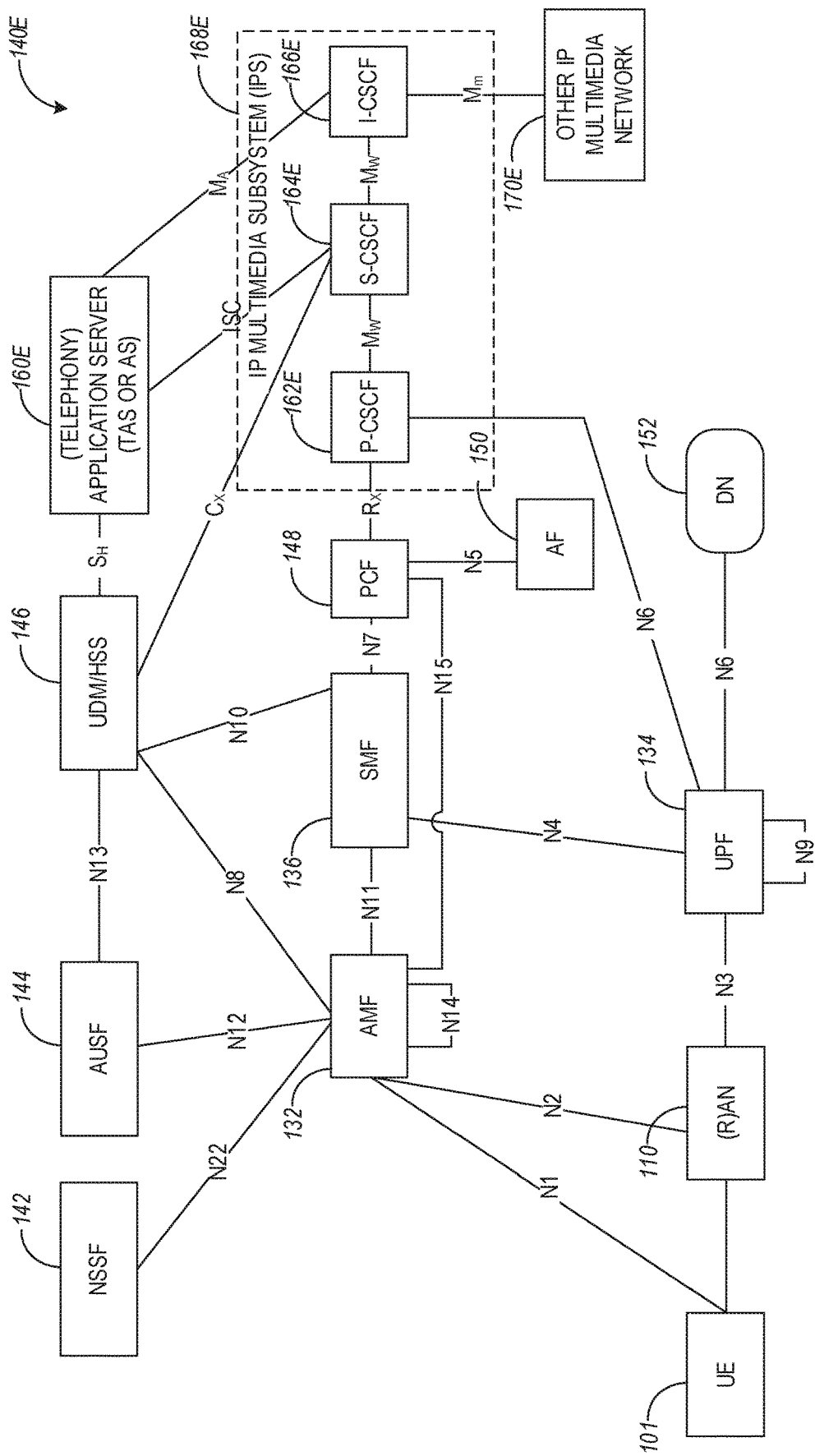
FIG. 1E illustrates a non-roaming 5G system architecture in accordance with some aspects.

FIG. 1E illustrates a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E or the I-CSCF 166E. In some aspects, the 5G system architecture 140E can use unified access barring mechanism using one or more of the techniques described herein, which access barring mechanism can be applied for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 2:
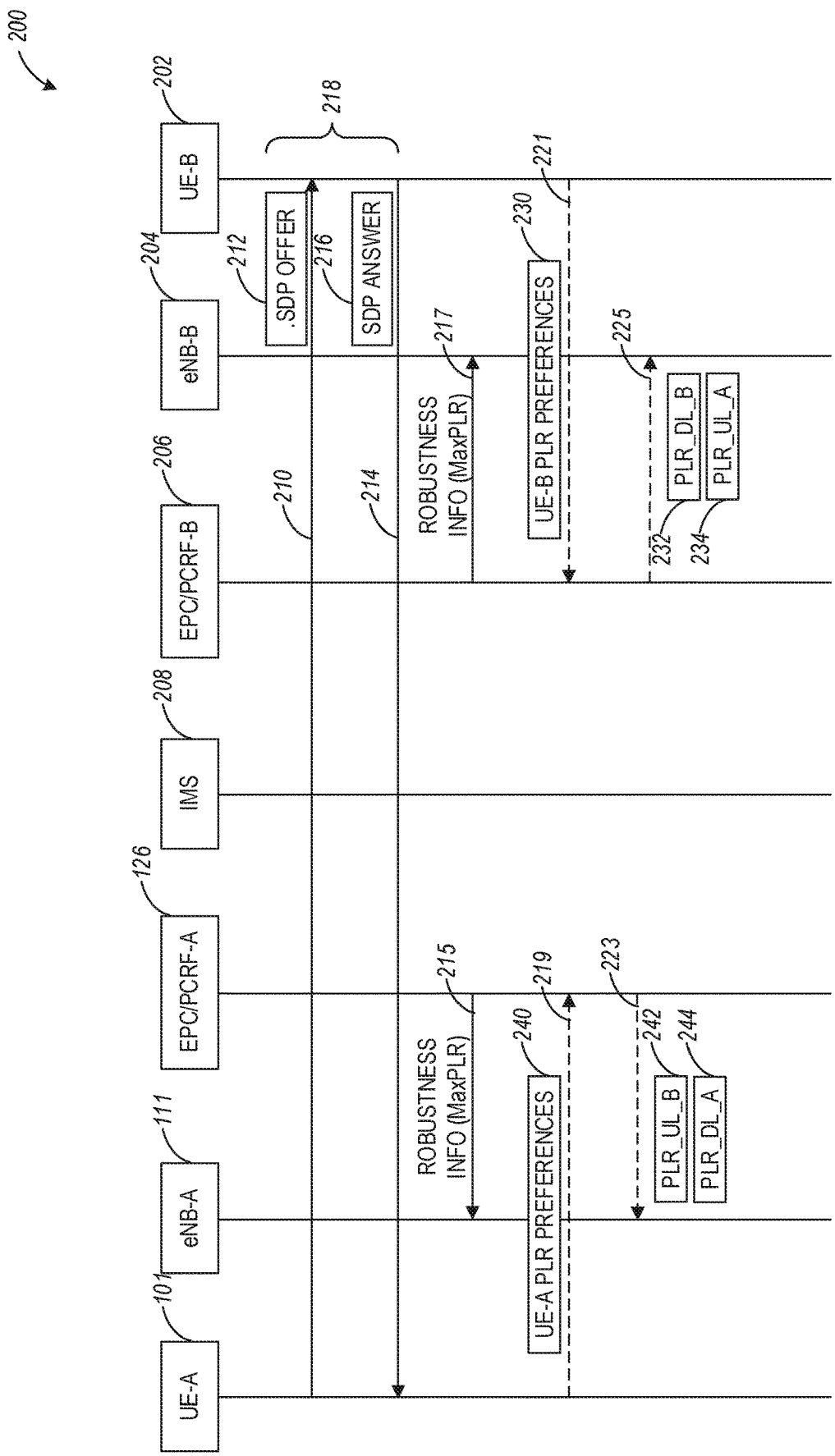
FIG. 2 illustrates a network-based solution for signal robustness information communicated to eNB for SRVCC handover determination, in accordance with some aspects.

Techniques disclosed herein can be used to enable dynamically adapting the PLR thresholds at the eNB toward enabling SRVCC handover optimization for VoLTE calls. More specifically, techniques disclosed herein take into account the dynamically varying coverage conditions on both ends of the communication link to be able to optimize the SRVCC handover thresholds. In addition to the negotiated codecs and codec modes, the end-to-end quality and robustness of the VoLTE connection also depend on the dynamic radio conditions on both ends of the communication link. In some aspects, the PLR parameter (e.g., PLR threshold) derived by PCRF (e.g., maxPLR, as illustrated in FIG. 2) and signaled to the eNB may not capture the impact of such dynamically varying radio conditions. As such, techniques disclosed herein can be used for further refinement on PLR thresholds determination and can be considered on a per session basis depending on the dynamic radio conditions.

In some aspects, techniques disclosed herein can be used to improve enhanced voice over LTE performance (EVOLP). It is important to maintain voice quality on LTE as high as possible and, therefore, avoiding or delaying SRVCC in order to minimize the negative impact on user experience for VoLTE subscribers in areas with weak LTE coverage. VoLTE calls could be handed over to 2/3G circuit switched (CS) network (e.g., a legacy network such as WCDMA network) unnecessarily via SRVCC handover (HO) even though the VoLTE call can survive weak coverage in the LTE (packet switched or PS) network. In some aspects, increased robustness of speech calls can be enabled by the selection of codecs and their configuration, in-call dynamic rate, mode adaptation, and application layer full redundancy. In some aspects, the EVS codec, especially the EVS Channel Aware mode, can be used for higher robustness against transmission errors in comparison to the AMR and AMR-WB codecs by application-layer partial redundancy. In some aspects, a PLR threshold parameter (e.g., maxPLR) can be used (e.g., as a maximum tolerable PLR threshold) to inform the eNB about the robustness of the selected codec. The robustness (i.e., maxPLR) information can be conveyed to the eNB using either the signaling from the network (e.g., signaling from the PCRF) or signaling from the UE. The eNB can derive the related SRVCC thresholds (which can be implementation dependent) from the maxPLR parameter. In case of multi-rate/multi-mode codec configurations, different codec modes can be associated with different maxPLR values, i.e., different robustness can be associated with different codecs or codec modes used by a UE for voice communication via VoLTE.

FIG. 2 illustrates a network-based solution for signal robustness information communicated to eNB for SRVCC handover determination, in accordance with some aspects. Referring to FIG. 2, diagram 200 illustrates various communications between network entities in connection with dynamic adaptation of PLR for SRVCC handover optimization. The network entities illustrated in FIG. 2 can include an IP multimedia subsystem (IMS) 208, a first UE 101 associated with a first eNB 111 and a first PCRF 126, as well as a second UE 202 associated with a second eNB 204 and a second PCRF 206.

The network-based solution illustrated in FIG. 2 relies on the fact that the information on the negotiated codecs and configurations (or codec modes) for the session is available in the PCRFs (e.g., 126 and 206) through its knowledge of the SDP that contains the negotiated session parameters. More specifically, during an SDP negotiation procedure 218, SDP messages such as an SDP offer 212 and an SDP answer 216 are exchanged between UE 101 and UE 202. Such SDP communication exchanges can be accessed by the PCRF entities 126 and 206, and the PCRF entities would have knowledge of the information contained in the SDP messages. Based on such information, the PCRF entities 126 and 206 can derive the relevant robustness parameter information (e.g., Maximum Packet Loss Rate or maxPLR) and signal this information to the corresponding eNBs 111 and 204 during operations 215 and 217. The derivation of the robustness parameter information (maxPLR) can be based on the negotiated codec modes (which can be obtained from the SDP messages) or can be performed subject to a standardized mapping rule, e.g., with an indication of packet loss rate for each codec mode and calculation of the maxPLR based on the negotiated codec modes.

In this solution, the PCRF entities 126 and 206 by default do not know the multimedia telephony service for IMS (MTSI) client (e.g., UEs 101 and 202) adaptation behavior, and would, therefore, set the robustness parameter maxPLR based on the least robust codec mode among the negotiated codec configurations. If, however, the PCRF entities 126 and 206 know from the SDP negotiation procedure 218 that the MTSI client receiver supports adaptation to the most robust codec mode, i.e., that the UE will request the sender to change its encoder to a more robust mode when it detects packet losses, then the PCRF entities 126 and 206 could set the robustness parameter based on the most robust codec mode, and thereby enabling a more optimized SRVCC handover performance. In some aspects, such indication to the PCRF entities can be enabled via an SDP parameter (e.g., SDP parameter "adapt").

In some aspects, SRVCC enhancements rely on the fixed allocation of PLR associated with an uplink (UL) communication link (e.g., UL PLR) and PLR associated with a downlink (DL) communication link (e.g., DL PLR) across the eNBs. However, such enhancements may not always provide the most optimal results in adjusting the SRVCC handover thresholds (e.g., when one of the eNBs enjoys very good radio conditions it is unable to dynamically raise the packet loss rates that can be tolerated at the far-end eNB which would allow the far-end eNB to delay the SRVCC handover for the negotiated codec configurations). A more dynamic allocation policy on UL PLR and DL PLR that considers the local RAN conditions on both ends of the link may, therefore, allow realizing further optimizations on the SRVCC handover thresholds.

In some aspects, in addition to the negotiated codecs and codec modes, the end-to-end quality and robustness of the VoLTE connection between UEs 101 and 202 also depend on the radio conditions on both ends of the link. In the meantime, the maxPLR parameter derived by the PCRF entities 126 and 206 (i.e., in the network-based architecture in FIG. 2) and signaled to the corresponding eNBs (e.g., at operations 215 and 217) may not capture the impact of such dynamic radio conditions. As such, further refinements related to maxPLR determination can be considered on a per session basis depending on the dynamic radio conditions.

In some aspects, each of the UEs may consider its de-jitter buffer management (JBM) and/or packet loss concealment (PLC) capabilities to derive a recommended maximum end-to-end packet loss rate (e.g., E2E MAXPLR_A for UE 101 and E2E MAXPLR_B for UE 202) that the UE can tolerate for a given codec/mode when using its JBM and PLC implementation, and signal this parameter, or some indication derived from it, to the network. For example and as illustrated in FIG. 2, UE PLR preferences (e.g., 240 and 230) that can include the E2E MAXPLR value can be included in the corresponding SDP messages (e.g., 212 and 216) which can be intercepted by the PCRF entities 126 and 206 at operations 219 and 221 respectively. The robustness parameter values used by the eNBs 111 and 204 may then use, or be refined based on, the E2E MAXPLR recommendations provided by the UEs.

In some aspects, a UE with advanced JBM and PLC capabilities may determine a recommended E2E MAXPLR value that is higher than the maxPLR determined by the PCRF entities and corresponding to the most robust codec configuration. In this regard, the PLC and JBM capabilities of the UEs 101 and 202 may be delivering further robustness on top of that delivered by the most robust codec configuration. In aspects when the eNBs 111 and 204 obtain such an indication of additional robustness from the UE (e.g., the E2E MAXPLR recommendations from the UEs), the eNBs may further delay the SRVCC handover decision even when the PCRF-provided maxPLR value (based on the most robust codec configuration) is exceeded, leading to more optimized SRVCC handovers. Furthermore, since there are typically two radio links in the end-to-end path from the sending terminal to the receiving terminal, the information has to ultimately be shared with the two eNBs (111 and 204) in the transport path to determine how to set their SRVCC handover thresholds and to achieve the appropriate PLR targets.

The PLR preferences 240 and 230 with the UE recommended E2E MAXPLR values are additional parameters for consideration by the eNBs, on top of the maxPLR value the eNBs would receive from the PCRF entities 126 and 206 at operations 215 and 217 (in case of the network-based architecture) or from the UE (in case of the UE-based architecture). If this information, or any other information derived from it, is to be signaled to the eNB, defining suitable RAN-level signaling from UE to eNB may be used, e.g., RRC level signaling can be used for communicating the PLR preferences 240 and 230 from the UEs to the corresponding eNBs.

Figure 3:
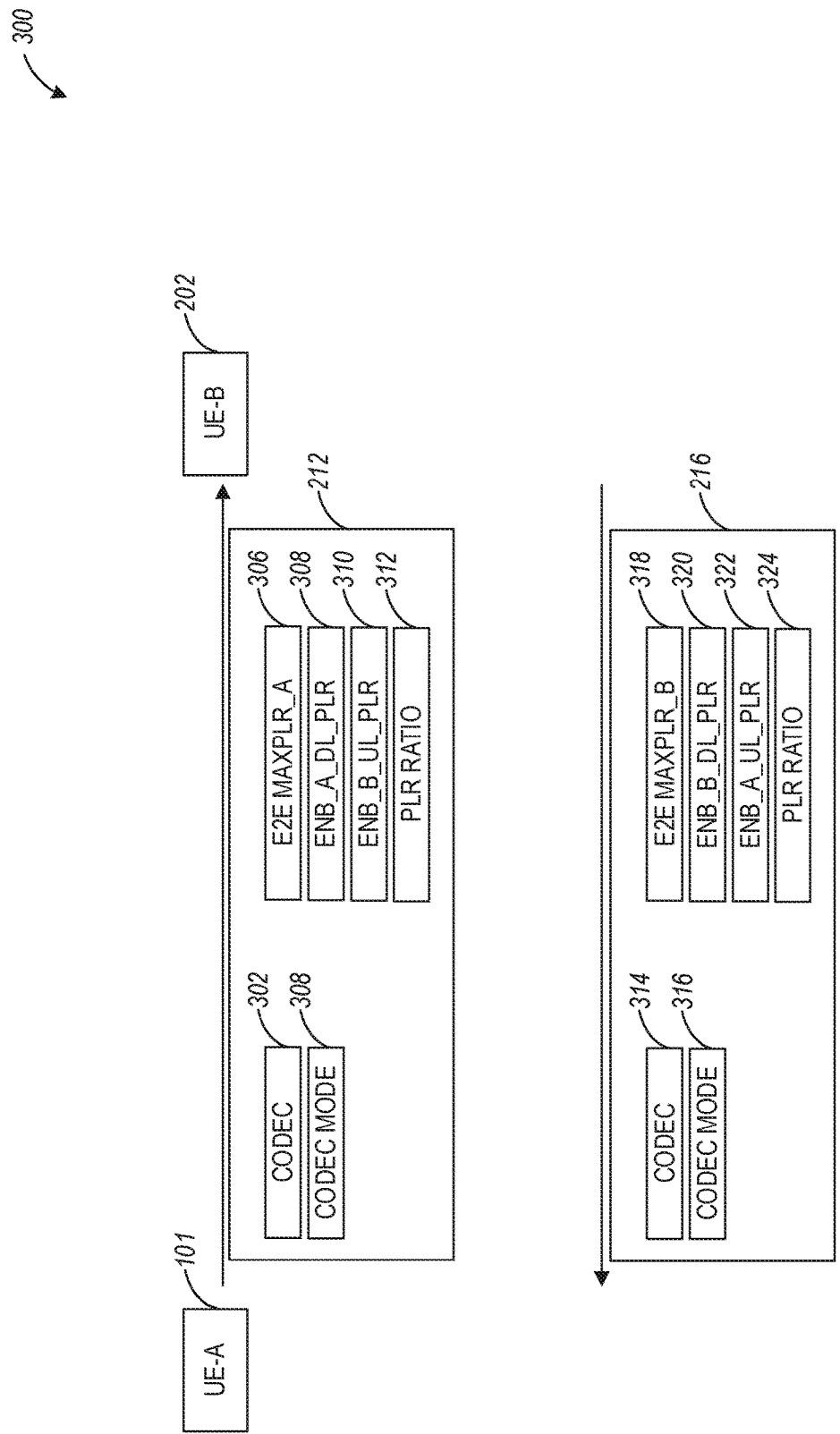
FIG. 3 illustrates example SDP communications which can be used for dynamic adaptation of maximum PLR for SRVCC handover optimization, in accordance with some aspects.

FIG. 3 illustrates example SDP communications which can be used for dynamic adaptation of maximum PLR for SRVCC handover optimization, in accordance with some aspects. Referring to FIG. 3, there is illustrated a more detailed diagram of the SDP messages 212 and 216 exchanged between UEs 101 and 202. For example, SDP message 212 can include an indication of a voice codec 302 and a codec mode 308 for use by UE 101 during a VoLTE call with UE 202. Additionally, SDP message 212 can include an end to end maximum recommended PLR value (e.g., E2E MAXPLR_A 306) that can be tolerated by the UE 101 when receiving voice communication traffic from UE 202. The SDP message 212 can further include a PLR split of the E2E MAXPLR_A 306 indicating PLR values that can be tolerated by UE 101 for the uplink communication traffic from UE 202 to eNB 204 (e.g., ENB_B_UL_PLR 310) and the downlink communication traffic from eNB 111 to UE 101 (e.g., ENB_A_DL_PLR 308). In some aspects, the SDP message 212 can further include a PLR ratio 312 which can be a ratio of the PLR values 308 and 310. The uplink and downlink split of the communication traffic is illustrated in greater detail in FIG. 4.

Similarly, SDP message 216 can include an indication of a voice codec 314 and a codec mode 316 for use by UE 202 during a VoLTE call with UE 101. Additionally, SDP message 216 can include an end to end maximum recommended PLR value (e.g., E2E MAXPLR_B 318) that can be tolerated by the UE 202 when receiving voice communication traffic from UE 101. The SDP message 216 can further include a PLR split of the E2E MAXPLR_B 318 indicating PLR values that can be tolerated by UE 202 for the uplink communication traffic from UE 101 to eNB 111 (e.g., ENB_A_UL_PLR 324) and the downlink communication traffic from eNB 204 to UE 202 (e.g., ENB_B_DL_PLR 320). In some aspects, the SDP message 216 can further include a PLR ratio 324 which can be a ratio of the PLR values 320 and 322.

Figure 4:
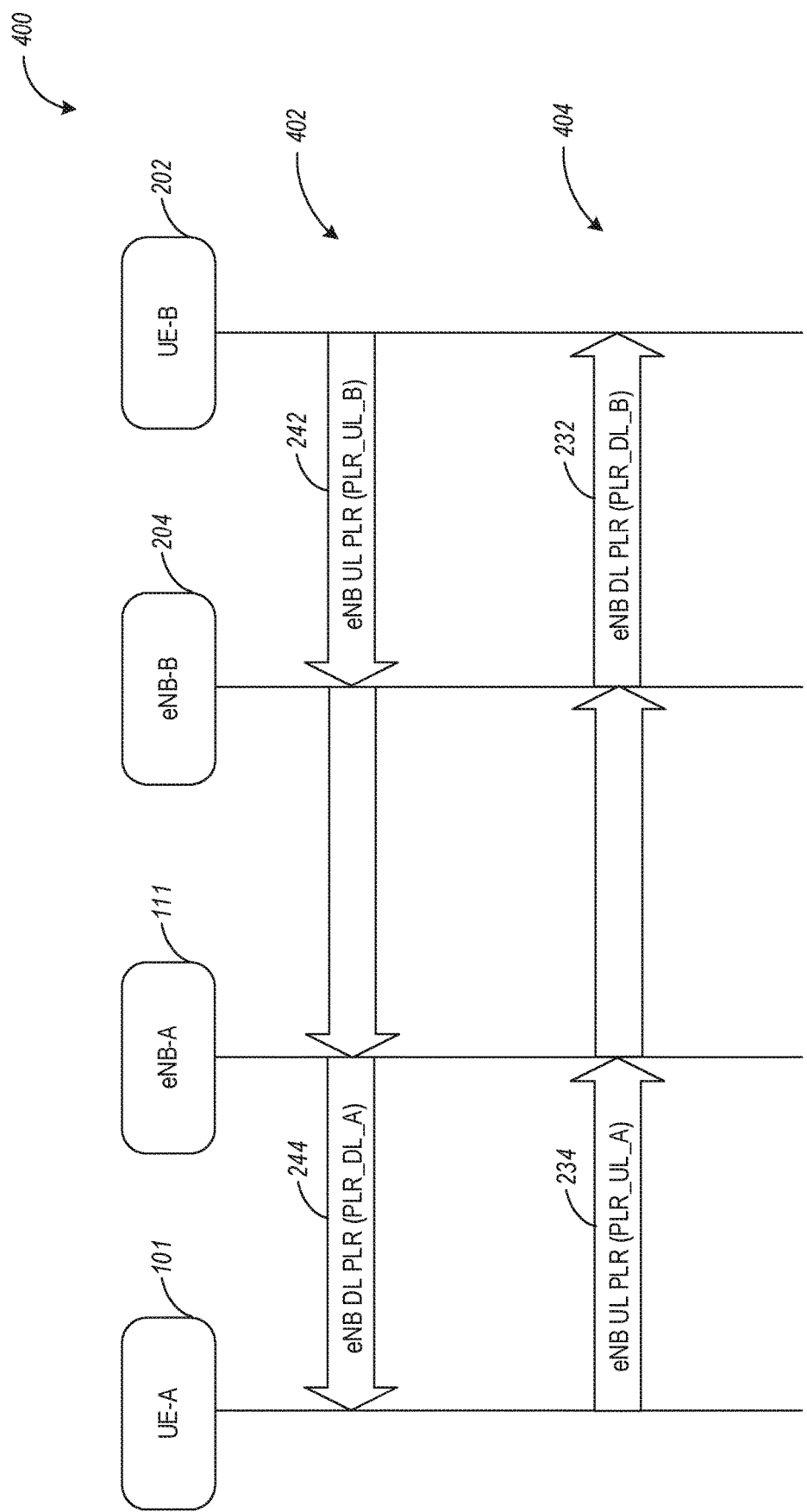
FIG. 4 illustrates example PLR splits for downlink and uplink paths between two UEs in an LTE network, in accordance with some aspects.

FIG. 4 illustrates example PLR splits for downlink and uplink paths between two UEs in an LTE network, in accordance with some aspects. Referring to FIG. 4, diagram 400 illustrates example voice communication traffic paths 402 and 4044 voice data that is received by the UE 101 and the UE 202 respectively. More specifically, the PCRF entities 126 and 206 can use the PLR preferences 240 and 230 included by the UEs within corresponding SDP messages such as 212 and 216 to generate PLR threshold values 242/244 for communication to eNB 111 (e.g., at operation 223) and PLR threshold values 232/234 for communication to eNB 204 (e.g., at operation 225).

For example, the PLR threshold values associated with communication traffic path 402 includes a PLR threshold value for uplink traffic between the UE 202 and eNB 204 (e.g., PLR_UL_B 242) and a PLR threshold value for downlink traffic between eNB 111 and the UE 101 (e.g., PLR_DL_A 244). Similarly, the PLR threshold values associated with communication traffic path 404 includes a PLR threshold value for uplink traffic between the UE 101 and eNB 111 (e.g., PLR_UL_A 234) and a PLR threshold value for downlink traffic between eNB 204 and the UE 202 (e.g., PLR_DL_B 232). In some aspects, the determination of the PLR threshold values 232, 234, 242, and 244 by the PCRF entities can be based on the UE preferences 240 and 230 as included within the SDP messages 212 and 216.

One of the challenges in setting the handover thresholds is to ensure that the end-to-end error rate across the transport path from the media sender to receiver does not exceed the maximum packet loss rate (maxPLR) that the codec, the PLC implementation, and/or the JBM implementation in the receiving UE can handle. In FIG. 4, assuming that the backhaul between the eNBs, in the transmission direction from UE 202 to UE 101 (i.e., communication path 402), ENB_A_DL_PLR (e.g., 308)+ENB_B_UL_PLR (e.g., 310) can be smaller than or equal to E2E MAXPLR_A (e.g., 306) that can be handled by UE 101 (taking into account PLC and JBM capabilities of UE 101). ENB_A_DL_PLR 308 is the maximum PLR value to be set as the threshold to trigger SRVCC for the DL connection between eNB 111 and UE 101. Likewise, ENB_B_UL_PLR 310 is the maximum PLR value to be set as the threshold to trigger SRVCC for the UL connection between eNB 204 and UE 202.

As such, UE 101 can determine the maximum PLR it can tolerate (e.g., E2E MAXPLR_A 306) based on its PLC and JBM implementation and then decide how this PLR can be distributed between ENB_A_DL_PLR 308 (PLR for downlink from eNB 111 to UE 101) and ENB_B_UL_PLR 310 (PLR for the uplink from UE 202 to eNB 204. In some aspects, UE 101 can decide on the value of eNB_A_DL_PLR 308 based on the evaluation of the local downlink radio conditions between UE 101 and eNB 111 and then determine ENB_B_UL_PLR 310 by subtracting ENB_A_DL_PLR from the maximum end-to-end PLR (E2E MAXPLR_A 306). The UE 101 can offer its recommended values for maximum end-to-end PLR (E2E MAXPLR_A 306), ENB_A_DL_PLR 308, and ENB_B_UL_PLR 310 in the SDP message (e.g., 212). As such, both the media receiver and the media sender have means to exchange UL PLR information, in order to dynamically optimize the allocation of DL PLR and UL PLR, and lead to the most optimal selection of the SRVCC handover thresholds on both ends of the link.

In FIG. 4, assuming that the backhaul between the eNBs, in the transmission direction from UE 101 to UE 202 (i.e., communication path 404), ENB_A_UL_PLR (e.g., 322)+ENB_B_DL_PLR (e.g., 320) can be smaller than or equal to E2E MAXPLR_B (e.g., 318) that can be handled by UE 202 (taking into account PLC and JBM capabilities of UE 202). ENB_A_UL_PLR 322 is the maximum PLR value to be set as the threshold to trigger SRVCC for the UL connection between eNB 111 and UE 101. Likewise, ENB_B_DL_PLR 320 is the maximum PLR value to be set as the threshold to trigger SRVCC for the DL connection between eNB 204 and UE 202.

In some aspects, UE 202 can determine the maximum PLR it can tolerate (e.g., E2E MAXPLR_B 318) based on its PLC and JBM implementation, and then decide how this PLR can be distributed between ENB_A_UL_PLR 322 and ENB_B_DL_PLR 320. In some aspects, UE 202 can decide on the value of ENB_B_DL_PLR 320 based on the evaluation of the local downlink radio conditions between UE 202 and eNB 204 and then determine ENB_A_UL_PLR 322 by subtracting ENB_B_B_DL_PLR 320 from the maximum end-to-end PLR (E2E MAXPLR_B 318). UE 202 may then signal its recommended values on maximum end-to-end PLR (E2E MAXPLR_B 318 at UE 202), ENB_A_UL_PLR 322, and ENB_B_DL_PLR 320 in the SDP message (e.g., 216).

Based on the SDP negotiation, the UEs can be configured to agree on the four values on DL/UL PLR thresholds, namely ENB_A_DL_PLR 308, ENB_A_UL_PLR 322, ENB_B_DL_PLR 320, and ENB_B_UL_PLR 310. Once agreed, the PCRF entities 126 and 206 can signal (e.g., at operations 223 and 225) the agreed-upon values to the respective eNBs and configure the DL/UL PLR thresholds (e.g., 242, 244, 232, and 234) for SRVCC handover accordingly.

In some aspects, to enable the dynamic allocation of UL PLR and DL PLR as defined above, the following SDP signaling framework can be considered in order to exchange PLR information based on dynamic radio conditions as described hereinabove:

A new SDP parameter can be included in SDP messages (e.g., 212) to indicate the ratio of UL PLR and DL PLR values, e.g., UL_DL_PLR_Ratio1 for the sent RTP stream, e.g. from UE 101 to UE 202. Based on the above, this ratio can be PLR ratio 324, which can be ENB_A_UL_PLR (e.g., 322)/ENB_B_DL_PLR (e.g., 320).

A new SDP parameter can be included in SDP messages (e.g., 212) to indicate the ratio of UL PLR and DL PLR values, e.g., UL_DL_PLR_Ratio2 for the received RTP stream, e.g. from UE 202 to UE 101. Based on the above, this ratio can be PLR ratio 312, which can be ENB_B_UL_PLR (e.g., 310)/ENB_A_DL_PLR (e.g., 308).

In some aspects, the values on UL_DL_PLR_Ratio1 and UL_DL_PLR_Ratio2 can be simultaneously negotiated in the SDP message exchange for a multimedia telephony session that involves bi-directional streaming of media over the forward and reverse links.

Once the UEs agree on these values and also agree on the negotiated codecs and codec configurations, the PCRF entities can first configure the maximum end-to-end PLR from the negotiated codecs and then compute the respective DL/UL PLR thresholds based on the agreed-upon values for UL_DL_PLR_Ratio1 and UL_DL_PLR_Ratio2. Then the PCRF entities can use the maximum end-to-end PLR and UL_DL_PLR_Ratio1 values to configure ENB_A_UL_PLR at eNB 111 and ENB_B_DL_PLR at eNB 204. The PCRF entities may also use the maximum end-to-end PLR and UL_DL_PLR_Ratio2 values to configure ENB_A_DL_PLR at eNB 111 and ENB_B_UL_PLR at eNB 204. Upon any major changes in radio conditions for their respective links, UE 101 or UE 202 may re-negotiate (e.g., using an SDP message exchange) the values on UL_DL_PLR_Ratio1 and UL_DL_PLR_Ratio2.

Figure 5:
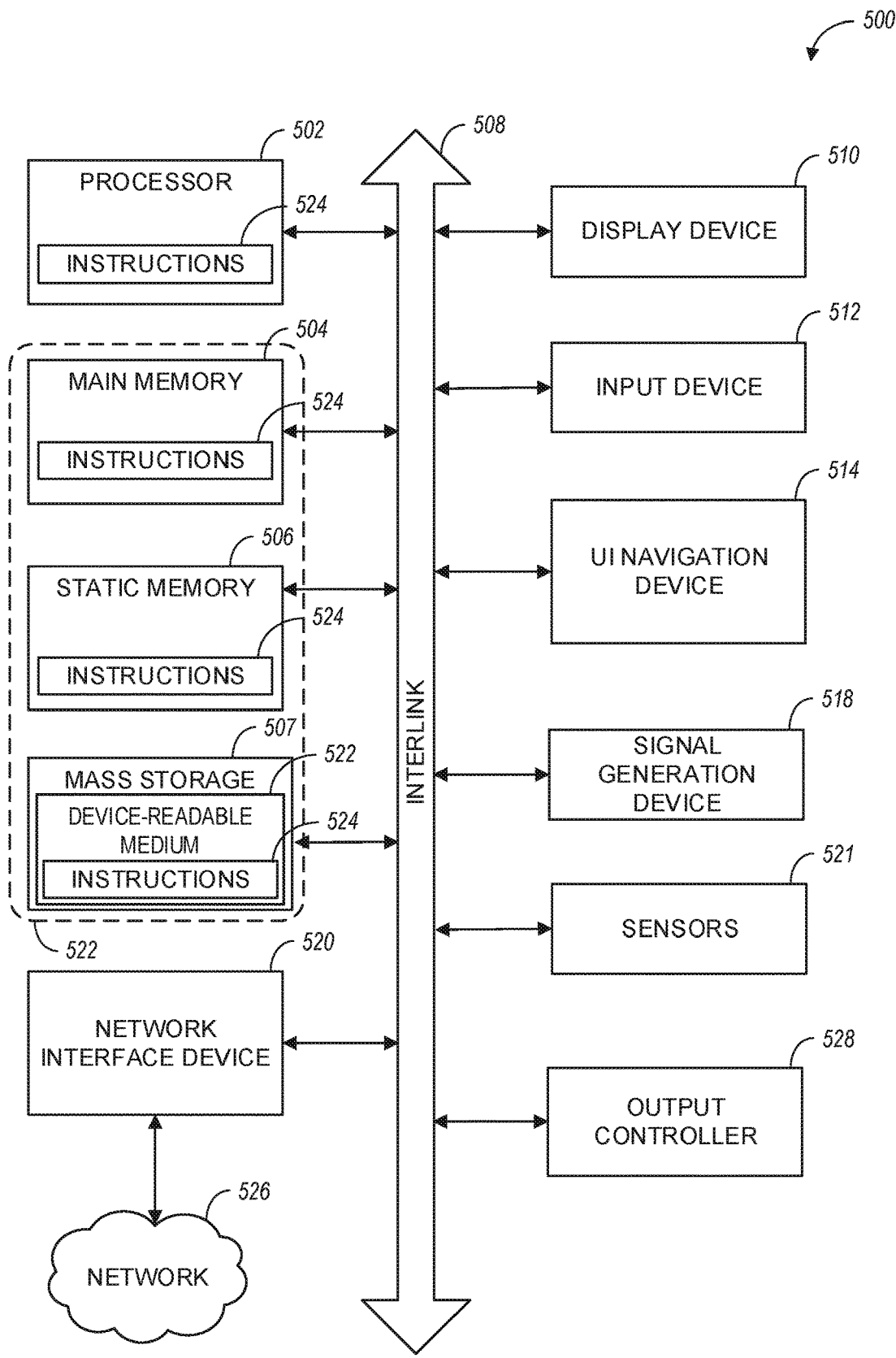
FIG. 5 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented intangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a stand-alone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touchscreen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524.

The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
at least one processor, wherein to configure a user equipment (UE) comprising a multimedia telephony for IMS (MTSI) client for handover from a first network to a second network, the at least one processor is configured to cause the UE to:
encode a Session Description Protocol (SDP) message for transmission to a second UE within the first network, the SDP message including a voice codec selection for voice communication with the second UE and a maximum end-to-end packet loss rate (E2E_MAX_PLR) that can be tolerated by the UE when using the voice codec;
decode a handover command from a base station within the first network, the handover command based on at least one packet loss rate (PLR) associated with a packet switched voice communication link between the UE and the second UE exceeding a PLR threshold, wherein the PLR threshold comprises a first PLR threshold (PLR_UL_B) for uplink voice communication traffic between the second UE and a second base station associated with the second UE and a second PLR threshold (PLR_DL_A) for downlink voice communication traffic between the base station and the UE, and wherein the handover command is based on one or both of: PLR associated with the uplink voice communication traffic between the second UE and the second base station exceeds the PLR_DL_B or PLR associated with the downlink voice communication traffic between the UE and the base station exceeds the PLR_DL_A; and
perform handover from the base station to another base station in the second network based on the handover command.

2. The apparatus of claim 1, wherein the at least one processor is configured to:
encode the SDP message to further include a PLR split of the E2E_MAX_PLR, the PLR split comprising:
a first PLR (BS_B_UL_PLR) for the uplink voice communication traffic between the second UE and the second base station that the UE can tolerate; and
a second PLR (BS_A_DL_PLR) for the downlink voice communication traffic between the UE and the base station that the UE can tolerate.

3. The apparatus of claim 2, wherein the at least one processor is configured to:
determine the BS_A_DL_PLR based on an evaluation of downlink radio link conditions between the base station and the UE; and
determine the BS_B_UL_PLR based on a difference of the E2E_MAX_PLR and the ENB_A_DL_PLR.

4. The apparatus of claim 2, wherein the SDP message further includes a ratio of the BS_B_UL_PLR and the BS_A_DL_PLR, wherein the PLR threshold is determined further based on the ratio.

5. The apparatus of claim 1, wherein the at least one processor is further configured to:
determine the E2E_MAX_PLR based on at least one of: the voice codec selection, packet loss concealment (PLC) capabilities of the UE, and de-jitter buffer management (JBM) capabilities of the UE.

6. The apparatus of claim 1, further comprising transceiver circuitry coupled to the at least one processor; and, one or more antennas coupled to the transceiver circuitry.

7. An apparatus comprising:
at least one processor, wherein to configure a user equipment (UE) comprising a multimedia telephony for IMS (MTSI) client for handover from a first network to a second network, the at least one processor is configured to cause a network node to:
decode a Session Description Protocol (SDP) message transmitted from the UE to a second UE within the first network, the SDP message including a voice codec selection for voice communication with the second UE and a maximum end-to-end packet loss rate (E2E_MAX_PLR) that can be tolerated by the UE when using the voice codec;
determine, based on the E2E_MAX_PLR, a first PLR threshold (PLR_UL_B) for uplink voice communication traffic between the second UE and a second base station associated with the second UE, and a second PLR threshold (PLR_DL_A) for downlink voice communication traffic between the base station and the UE; and
encode the PLR_UL_B and the PLR_DL_A for transmission to the base station, wherein a handover command generated by the base station for the UE is based on one or both of: PLR associated with the uplink voice communication traffic between the second UE and the second base station exceeds the PLR_UL_B or PLR associated with the downlink voice communication traffic between the UE and the base station exceeds the PLR_DL_A.

8. The apparatus of claim 7, wherein the at least one processor is configured to:
decode the SDP message to determine a PLR split of the E2E_MAX_PLR, the PLR split comprising:
a first PLR (BS_B_UL_PLR) for the uplink voice communication traffic between the second UE and the second base station that the UE can tolerate; and
a second PLR (BS_A_DL_PLR) for the downlink voice communication traffic between the UE and the base station that the UE can tolerate.

9. The apparatus of claim 8, wherein the at least one processor is configured to:

determine the PLR_UL_B and the PLR_DL_A further based on the BS_B_UL_PLR and the BS_A_DL_PLR.

10. The apparatus of claim 8, wherein the at least one processor is configured to:
   decode the SDP message to determine a ratio of the BS_B_UL_PLR and the BS_A_DL_PLR.

11. The apparatus of claim 10, wherein the at least one processor is configured to:
   determine the PLR_UL_B and the PLR_DL_A further based on the ratio of the BS_B_UL_PLR and the BS_A_DL_PLR.

12. A non-transitory computer-readable storage medium that stores instructions for execution by one or more processors of a user equipment (UE) comprising a multimedia telephony for IMS (MTSI) client, the instructions to configure the one or more processors for handover from a first network to a second network and to cause the UE to:
   encode a Session Description Protocol (SDP) message for transmission to a second UE within the UE network, the SDP message including a voice codec selection for voice communication with the second UE and a maximum end-to-end packet loss rate (E2E_MAX_PLR) that can be tolerated by the UE when using the voice codec;
   decode a handover command from a base station within the first network, the handover command based on at least one packet loss rate (PLR) associated with a packet switched voice communication link between the UE and the second UE exceeding a PLR threshold, wherein the PLR threshold comprises a first PLR threshold (PLR_UL_B) for uplink voice communication traffic between the second UE and a second base station associated with the second UE and a second PLR threshold (PLR_DL_A) for downlink voice communication traffic between the base station and the UE, and wherein the handover command is based on one or both of: PLR associated with the uplink voice communication traffic between the second UE and the second base station exceeds the PLR_UL_B or PLR associated with the downlink voice communication traffic between the UE and the base station exceeds the PLR_DL_A; and
   perform handover from the base station to another base station in the second network based on the handover command.

13. The non-transitory computer-readable storage medium of claim 12, wherein the instructions further cause the UE to:
   encode the SDP message to further include a PLR split of the E2E_MAX_PLR, the PLR split comprising:
      a first PLR (BS_B_UL_PLR) for the uplink voice communication traffic between the second UE and the second base station that the LE can tolerate; and
      a second PLR (BS_A_DL_PLR) for the downlink voice communication traffic between the UE and the base station that the UE can tolerate.

14. The non-transitory computer-readable storage medium of claim 13, wherein the processing circuitry is configured to:
   determine the BS_A_DL_PLR based on an evaluation of downlink radio link conditions between the base station and the UE; and
   determine the BS_B_UL_PLR based on a difference of the E2E_MAX_PLR and the ENB_A_DL_PLR.

15. The non-transitory computer-readable storage medium of claim 13, wherein the SDP message further includes a ratio of the BS_B_UL_PLR and the BS_A_DL_PLR, wherein the PLR threshold is determined further based on the ratio.

16. The non-transitory computer-readable storage medium of claim 12, wherein the instructions are further executable to:
   determine the E2E_MAX_PLR based on at least one of: the voice codec selection, packet loss concealment (PLC) capabilities of the UE, and de-jitter buffer management (JBM) capabilities of the UE.

17. The apparatus of claim 1, wherein the SDP further includes a ratio of downlink to uplink packet loss ratios.

18. The apparatus of claim 7, wherein the SDP further includes a ratio of downlink to uplink packet loss ratios.

19. The non-transitory computer-readable storage medium of claim 12, wherein the SDP further includes a ratio of downlink to uplink packet loss ratios.

* * * * *